(12) United States Patent
Sergyeyenko et al.

(10) Patent No.: US 8,776,383 B2
(45) Date of Patent: Jul. 15, 2014

(54) CLAMP FOR RECIPROCATING SAW

(75) Inventors: Oleksiy P. Sergyeyenko, Brockville (CA); David C. Campbell, Bel Air, MD (US); Brent A. Kuehne, Red Lion, PA (US)

(73) Assignee: Black & Decker Inc., Newark, DE (US)

( * ) Notice: Subject to any disclaimer, the term of this patent is extended or adjusted under 35 U.S.C. 154(b) by 629 days.

(21) Appl. No.: 12/893,659

(22) Filed: Sep. 29, 2010

(65) Prior Publication Data

US 2012/0073148 A1    Mar. 29, 2012

(51) Int. Cl.
*B27B 11/04* (2006.01)
*B23D 51/04* (2006.01)
*B23D 49/16* (2006.01)

(52) U.S. Cl.
CPC .............. *B23D 49/167* (2013.01); *B23D 51/04* (2013.01); *B23D 46/162* (2013.01)
USPC ...................... 30/371; 30/92; 30/373; 30/392

(58) Field of Classification Search
USPC ........... 30/373, 378, 392, 393, 286, 371, 372, 30/374, 375, 92
See application file for complete search history.

(56) References Cited

U.S. PATENT DOCUMENTS

| 2,568,791 | A | * | 9/1951 | Cooper | 30/92 |
|---|---|---|---|---|---|
| 2,645,011 | A | * | 7/1953 | Otis | 30/378 |
| 3,449,992 | A | * | 6/1969 | Hanaway | 83/455 |
| 3,834,019 | A | * | 9/1974 | Smeltzer et al. | 30/92 |
| 4,437,237 | A | * | 3/1984 | Ducret | 30/90.2 |
| 4,676,001 | A | * | 6/1987 | Wagner | 30/393 |
| 4,747,212 | A | | 5/1988 | Cavdek | |
| 5,038,473 | A | * | 8/1991 | Bradley | 30/92 |
| 5,611,146 | A | | 3/1997 | Ducret | |
| 5,632,089 | A | * | 5/1997 | Sakamoto et al. | 30/92 |
| 5,806,187 | A | * | 9/1998 | Ducret | 30/92 |
| 6,067,716 | A | * | 5/2000 | Carter | 30/92 |
| 6,205,897 | B1 | | 3/2001 | Carter | |

(Continued)

FOREIGN PATENT DOCUMENTS

| DE | 8507971 U1 | 5/1985 |
|---|---|---|
| DE | 4104296 A1 | 8/1992 |
| EP | 0603625 A1 | 6/1994 |
| FR | 2611351 A1 | 9/1988 |

*Primary Examiner* — Omar Flores Sanchez
(74) *Attorney, Agent, or Firm* — Harness, Dickey & Pierce, P.L.C.

(57) ABSTRACT

A reciprocating saw can include a housing and a motor disposed in the housing. A blade retaining mechanism can receive a saw blade. A drive mechanism can translate rotational motion of the motor into reciprocating motion of the blade retaining mechanism. A clamp assembly can include first and second shoes that are coupled to the housing. The first shoe can have a first shoe body that includes a first material facing surface. The second shoe can include a second material facing surface that opposes the first material facing surface and that defines a clamping distance therebetween. At least one of the first and second shoes is selectively adjustable relative to the housing, such that the clamping distance can be altered. One of the first or second shoe bodies can have a third material facing surface that comprises an arcuate section defining a radius.

27 Claims, 8 Drawing Sheets

(56) References Cited

U.S. PATENT DOCUMENTS

| | | | |
|---|---|---|---|
| 6,449,851 B1 * | 9/2002 | Bone et al. | 30/372 |
| 6,484,409 B2 * | 11/2002 | Campbell et al. | 30/371 |
| 6,553,669 B2 | 4/2003 | Carter | |
| 6,691,417 B2 * | 2/2004 | Campbell et al. | 30/371 |
| 6,751,838 B1 | 6/2004 | Carter | |
| 6,941,660 B1 * | 9/2005 | Varos | 30/93 |
| 7,121,008 B2 * | 10/2006 | Bone et al. | 30/372 |
| 7,313,868 B2 | 1/2008 | Izumo | |
| 8,146,258 B2 * | 4/2012 | Shafer | 30/371 |
| 2010/0031518 A1 | 2/2010 | Fedor | |

\* cited by examiner

CLAMP FOR RECIPROCATING SAW

FIELD

The present disclosure relates to reciprocating saws and more particularly to a clamp assembly on a reciprocating saw.

BACKGROUND

This section provides background information related to the present disclosure which is not necessarily prior art.

Craftsman and builders have used reciprocating saws and jigsaws throughout the industry to perform various cutting operations. A conventional reciprocating saw or jigsaw can generally consist of a housing having a motor, a drive mechanism for translating rotational motion of the motor into linear actuation of a carrier or driveshaft, and a saw blade releasably coupled to the drive shaft. In some applications, a user may use a reciprocating saw to cut cylindrical objects, such as pipes for example. In such an application, the user can hold the saw at a handle portion and bring the reciprocating saw blade into contact with the cylindrical piece.

The reciprocating saw blade can slowly be moved through the cylindrical item while cutting it. The reciprocating movements of the saw blade can exert forces on the object which is being cut, i.e., the pipe. As a result, the object being cut can try to follow the saw blade since there can be a considerable friction between the reciprocating saw blade and the pipe. Therefore, in some instances, a user can grip the pipe and hold it tightly with one hand against the saw while the reciprocating saw is held in the other hand in order to achieve an accurate cut. Such a scenario can present an inconvenient cutting experience. Furthermore, the cut can be inaccurate if the reciprocating saw blade is not steadily held in the same position with respect to the pipe.

SUMMARY

This section provides a general summary of the disclosure, and is not a comprehensive disclosure of its full scope or all of its features.

A reciprocating saw constructed in accordance to one example of the present teachings can include a housing and a motor disposed in the housing. A blade retaining mechanism can receive a saw blade. A drive mechanism can translate rotational motion of the motor into reciprocating motion of the blade retaining mechanism. A clamp assembly can include first and second shoes that are coupled to the housing. The first shoe can have a first shoe body that includes a first material facing surface. The second shoe can include a second material facing surface that opposes the first material facing surface and that defines a clamping distance therebetween. At least one of the first and second shoes is selectively adjustable relative to the housing, such that the clamping distance can be altered. One of the first or second shoe bodies can have a third material facing surface that comprises an arcuate section defining a radius.

According to additional features, the second shoe body can comprise the arcuate section that has the third material facing surface. The second shoe body can be selectively adjustable relative to the housing. The third material facing surface can be oriented in an unopposing relationship to a cutting surface of the saw blade. The second shoe body can be selectively adjustable to a location where the clamping distance is at least as large as two times the radius. According to one example, the second shoe body can be selectively adjustable to a location where the clamping distance is at least 1.5 inches. The radius can comprise substantially about 0.75 inches, such that the arcuate section can accommodate an object being cut that has a diameter of substantially about 1.5 inches.

Both of the first and second shoe bodies can define an opening for receiving the saw blade. The second shoe can further comprise a connection portion that connects the second shoe body to the housing. The connection portion can have a longitudinal body including a longitudinal opening that extends substantially transverse to the second material facing surface. A securing bolt can locate through the longitudinal opening and be selectively locked to the housing. According to one example, the first shoe body can also be selectively adjustable relative to the housing resulting in changing of the clamping distance.

In other features, the second shoe body can include a cylindrical member that selectively locates in one of a plurality of grooves formed on the housing. The clamping distance can alter based on the cylindrical member being located in a selected groove of the plurality of grooves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. While the following discussion is directed toward using a clamping assembly on a reciprocating saw to cut cylindrical items, such as pipe, the clamping assembly can be used to facilitate cutting of other non-cylindrical items as well.

Figure 1:
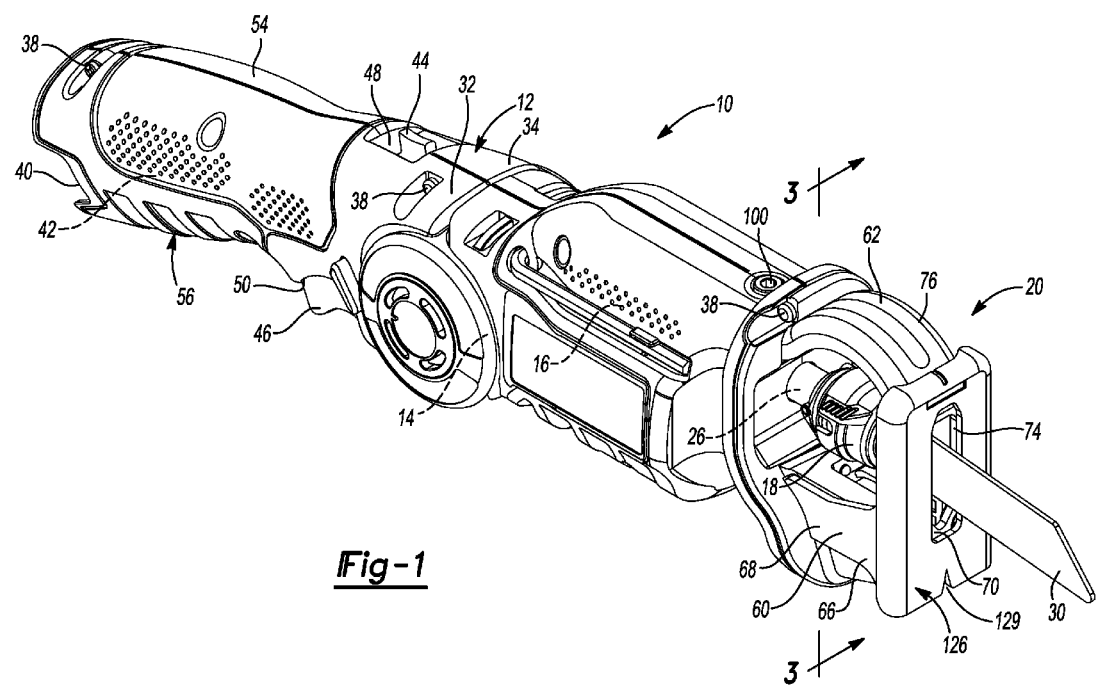
FIG. 1 is a perspective view of an exemplary reciprocating saw that incorporates a clamp assembly according to one example of the present teachings.
Figure 2:
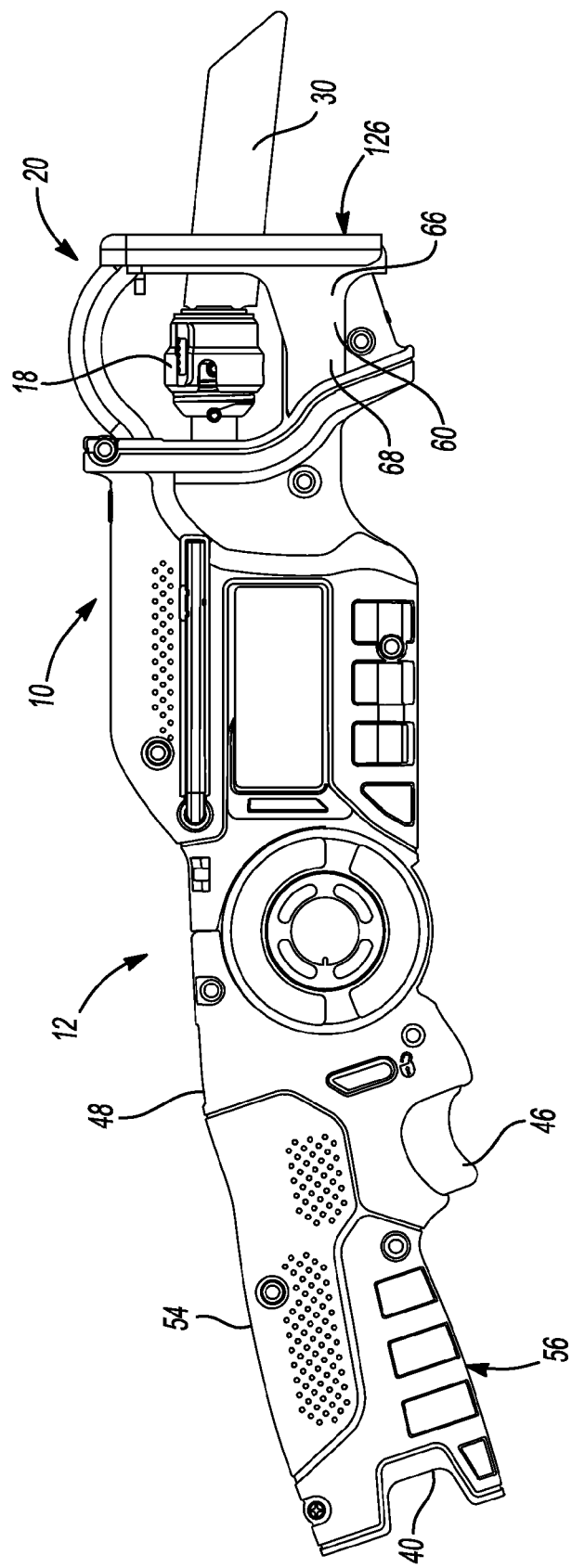
FIG. 2 is a side view of the exemplary reciprocating saw shown in FIG. 1.

With initial reference to FIGS. 1 and 2, a reciprocating saw according to the teachings of the present disclosure is illustrated and generally identified at reference numeral 10. The reciprocating saw 10 can include a housing 12 having a motor 14, a drive mechanism 16, a blade retaining mechanism 18 and a clamp assembly 20. The drive mechanism 16 can be configured to translate rotational motion of the motor 14 into linear actuation of a drive shaft 26. The blade retaining mechanism 18 can releasably couple a saw blade 30 to the drive shaft 26.

The housing 12 can generally comprise a first clam shell portion 32 and a second clam shell portion 34 that are secured to each other by a series of fasteners 38. The housing 12 can define a cavity 40 that receives a battery 42. A power switch 44 and a trigger 46 can each extend through openings 48 and 50, respectively formed in the housing 12. The housing 12 can further comprise a handle 54 that has a gripping portion 56. In the exemplary configuration, the trigger 46 can be configured to communicate a voltage from the battery 42 to the motor 14. Those skilled in the art will readily appreciate that while the exemplary reciprocating saw 10 is shown as a battery-powered embodiment, the principles of the present disclosure can also be adapted for use with a corded, alternating current reciprocating saw.

Figure 3:
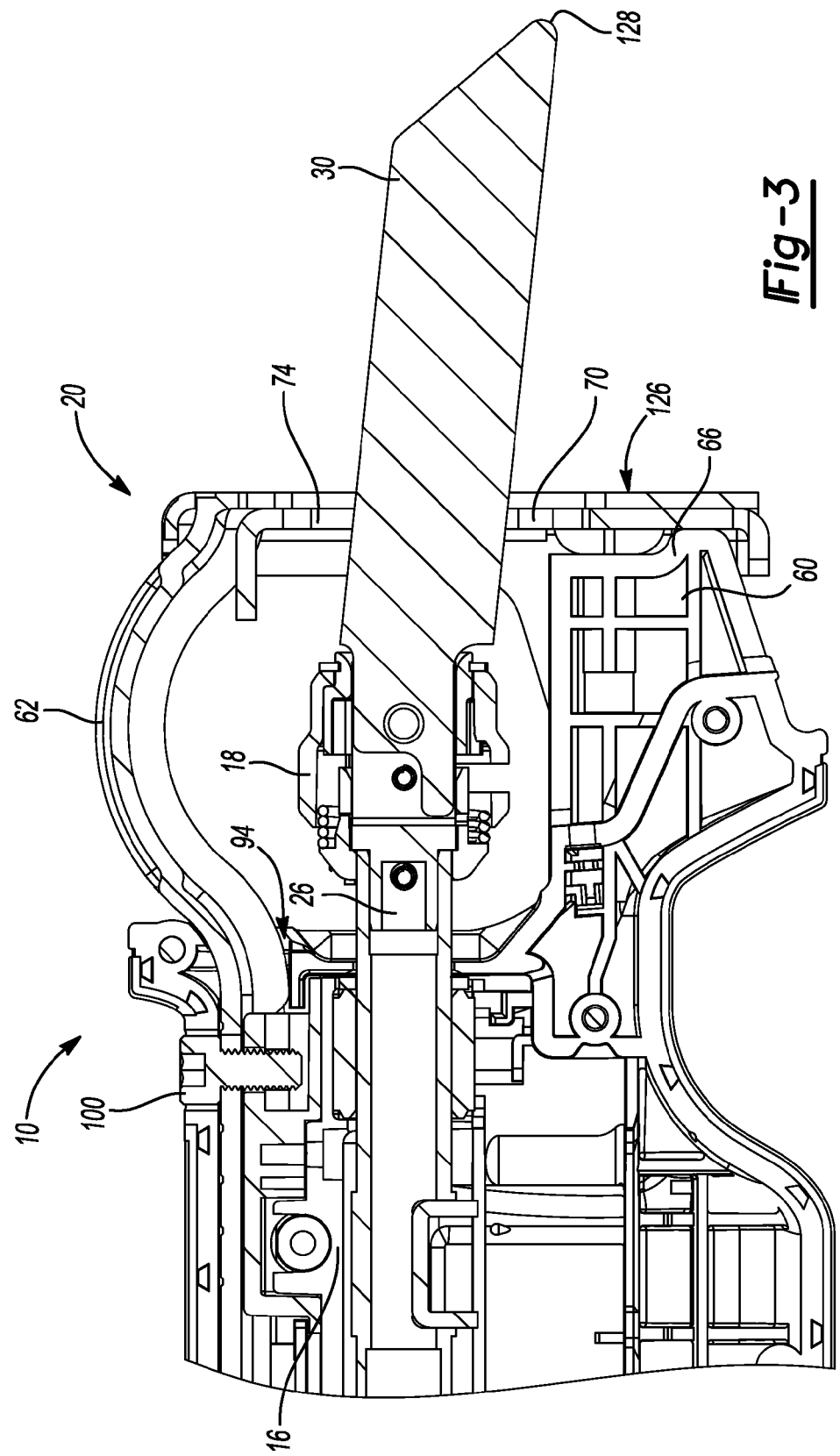
FIG. 3 is a cross-sectional view of a portion of the reciprocating saw taken along lines 3-3 of FIG. 1.
Figure 4:
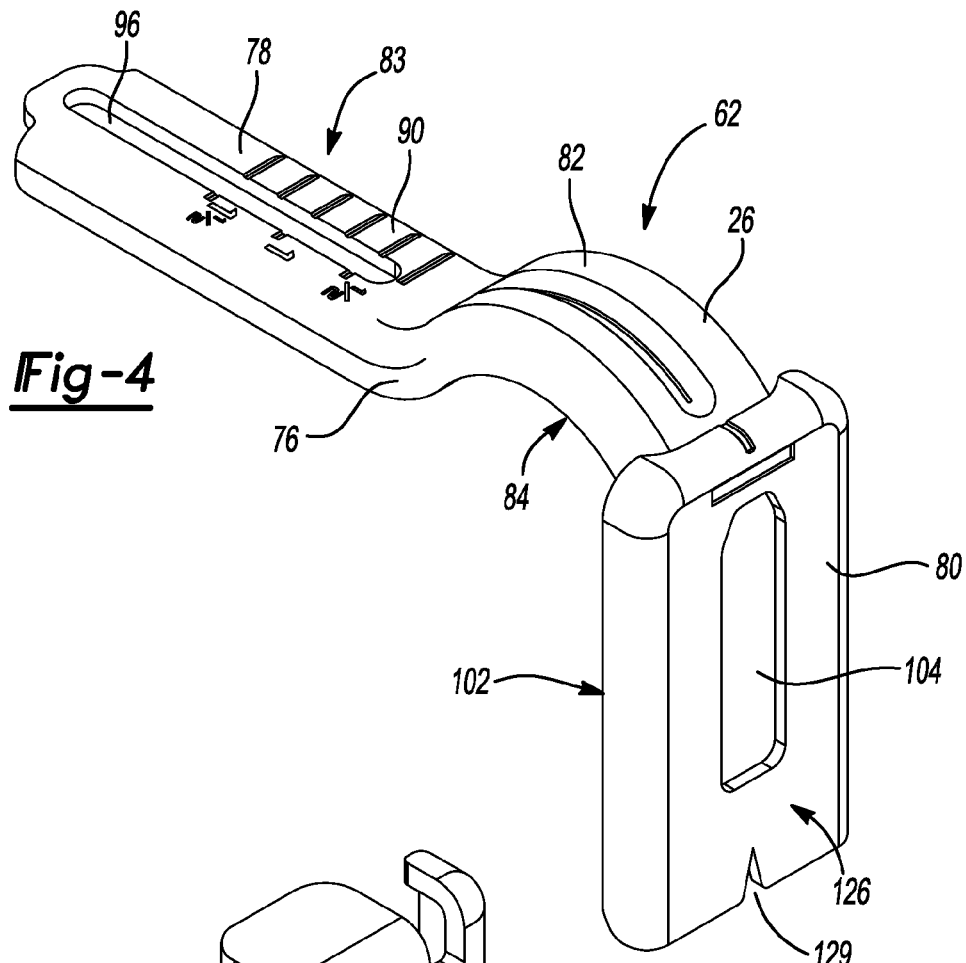
FIG. 4 is a perspective view of an upper movable shoe of the clamp assembly shown in FIG. 1.
Figure 5:
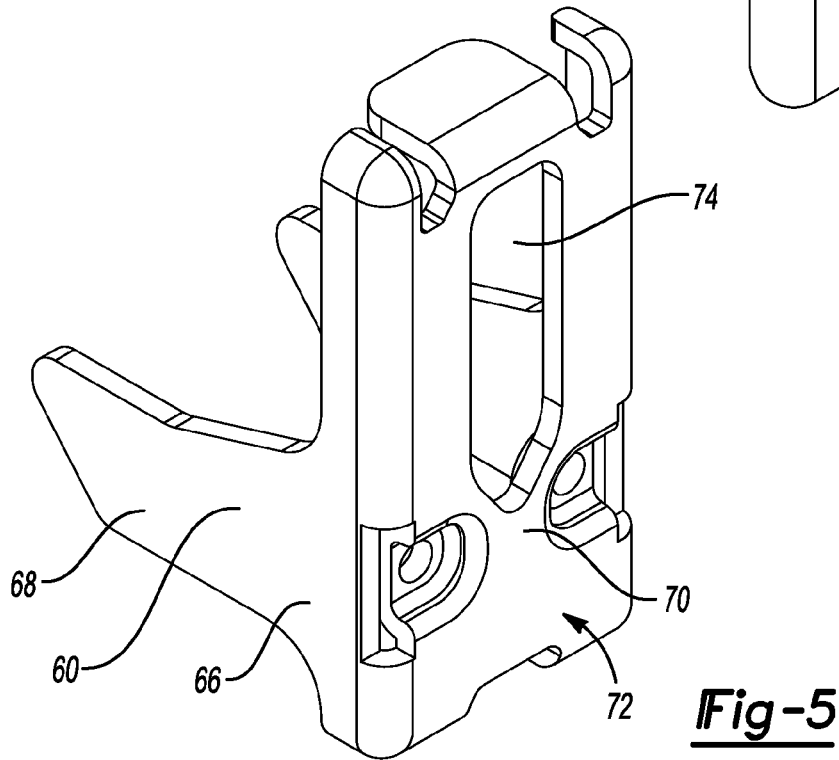
FIG. 5 is a perspective view of a lower fixed shoe of the clamp assembly of FIG. 1.

With continued reference to FIGS. 1 and 2 and additional reference now to FIGS. 3-5, the clamp assembly 20 will be described in greater detail. The clamp assembly 20 can generally comprise a first or lower fixed shoe 60 and a second or upper movable shoe 62. The lower fixed shoe 60 can be fixedly connected to the housing 12, such as by fasteners or can be formed at least in part by an extension of the housing 12. The lower fixed shoe can generally comprise a fixed shoe body 66 having a connection portion 68 and a clamping portion 70. The clamping portion 70 can comprise a material facing surface 72 that defines an opening 74 (FIG. 5) for receiving the saw blade 30.

The upper movable shoe 62 can generally comprise a movable shoe body 76 having a connection portion 78 (FIG. 4) and a clamping portion 80. An arcuate section 82 can be provided on the movable shoe body 76. Indicia 83 can be provided on the connecting portion 78. As will be described in greater detail herein, the arcuate section 82 can have a material facing surface 84 that defines a radius 86 (FIG. 7) for accommodating various objects to be cut. The arcuate section 82 can more generally comprise a central section that is offset away from the saw blade 30 relative to other portions of the upper movable shoe 62, such as the connection portion 78. For example, the arcuate section 82 can alternatively comprise a polygonal shape or combination of straight and arcuate sections.

The connecting portion 78 further includes a longitudinal body 90 that can be slidably extended and retracted from a slot 94 (FIG. 3) provided in the housing 12. The longitudinal body 90 can define a longitudinal opening 96 (FIG. 4) that can receive a securing bolt 100 (FIG. 3) that is threadably coupled to the housing 12. The clamping portion 80 of the movable shoe body 76 can include a material facing surface 102 that generally opposes the material facing surface 72 of the fixed shoe body 66. An opening 104 can be formed through the clamping portion 80 that corresponds to and aligns with the opening 74 for receiving the saw blade 30. A clamping distance 106 (FIG. 6) can be defined between the material clamping surfaces 72 and 102 of the fixed shoe body 66 and the movable shoe body 76, respectively.

Figure 6:
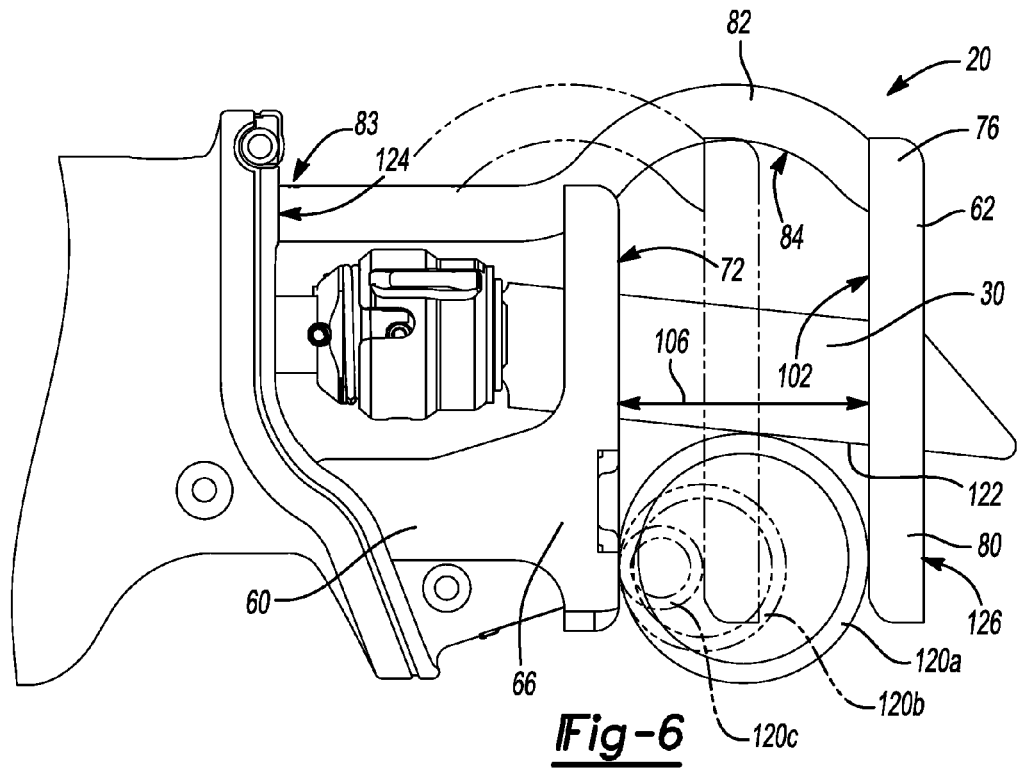
FIG. 6 is a perspective view of the reciprocating saw shown with the upper movable shoe adjusted to accommodate pipes of various diameters.

Referring now to FIG. 6, additional features of the clamp assembly 20 will be described. As will become appreciated from the following discussion, the arcuate section 82 of the movable shoe body 76 can progressively receive an object being cut, such as any of the various exemplary pipes 120a, 120b and 120c. For example, the exemplary pipe 120a can have a diameter of one and a half inches, the pipe 120b can have a diameter of three-quarter inch and the pipe 120c can have a diameter of one-quarter inch. The clamp assembly 20 according to the present teachings can provide a geometrical configuration that allows a relatively large pipe (such as pipe 120a) to be placed initially between the material facing surfaces 72 of the fixed shoe 60 and the material facing surface 102 of the movable shoe 62. Moreover, the arcuate section 82 can accommodate an outer surface of the pipe being cut (such as the pipe 120a) subsequent to a cutting surface 122 of the saw blade 30 passing completely through the pipe 120a (see FIG. 7). In this regard, the upper movable shoe 62 can be adjusted to a location where the clamping distance 106 is at least as large as two times the radius 86 of the arcuate section 82 of the movable shoe body 76. For example, the radius 86 can be substantially about the three-quarter inch and the upper movable shoe 62 can be adjusted to a location where the clamp distance is substantially about one and a half inches.

The material facing surface 84 is oriented in an unopposing relationship to the cutting surface 122. Once the cutting surface 122 of the saw blade 30 has sufficiently cut through the pipe 120a, the arcuate section 82, and more specifically the material facing surface 84 can oppose, and in some examples, engage a portion of the remaining pipe 120a. It will be appreciated that a distance 123 (FIG. 7) measured between an apex of the material facing surface 84 and the cutting surface 122 can be at least as large as two times the radius 86 (or at least as large as the diameter of the pipe 120a) ensuring the pipe 120a has been cut completely through prior to potentially engaging the material facing surface 84. In this regard, a user can be offered greater control of the reciprocating saw 10 even subsequent to the pipe 120a being completely cut through. Additionally, the respective material facing surface 72 of the fixed shoe 60 and the material facing surface 102 of the movable shoe 62 can progressively guide the pipe (120a, etc.) into the cutting surface 122 of the saw blade 30 providing greater control of the reciprocating saw 10 from initial positioning of the clamp assembly 20 around the pipe 120a (FIG. 6), as well as during cutting of the pipe 120a. In this way, vibrations transmitted from the saw blade 30 onto the pipe 120a can be controlled and minimized by the fixed shoe 60 and the movable shoe 62.

One exemplary sequence of using the clamp assembly 20 of the reciprocating saw 10 will now be described. At the outset, a user can extend the upper movable shoe 62 outwardly (in a direction rightward as viewed from FIG. 6) until the clamping distance 106 is substantially equivalent to a diameter of the pipe (120a, 120b, 120c, etc.) to be cut. According to some examples, a user must first loosen the securing bolt 100 (FIG. 3) on the housing 12, such that the upper movable shoe 62 can be extended out of the slot 94 while the securing bolt 100 travels along the longitudinal opening 96 of the movable shoe 62. The indicia 83 can alternatively or additionally be referenced off of a forward face 124 (FIG. 6) of the housing 12 to match a diameter of the pipe being cut. Once the movable shoe has been positioned in the desired location, the user can tighten the securing bolt 100 to the housing 12 to lock the movable shoe 62 in a fixed position. Next, a user can move the cutting surface 122 of the saw blade 30 into contact with the pipe (120a, 120b, 120c, etc.) being cut and concurrently or subsequently depress the trigger 46 to activate the motor 14 and begin cutting. While the saw blade 30 cuts through the pipe (120a, 120b, 120c, etc.) being cut, vibrations transmitted between the saw blade 30, pipe being cut (120a, 120b, 120c), fixed shoe 60 and movable shoe 62 are minimized as the pipe is inhibited from lateral movement (leftward or rightward as viewed from FIG. 6) by the material facing surface 72 of the lower fixed shoe and the material facing surface 102 of the movable shoe 62.

Figure 7:
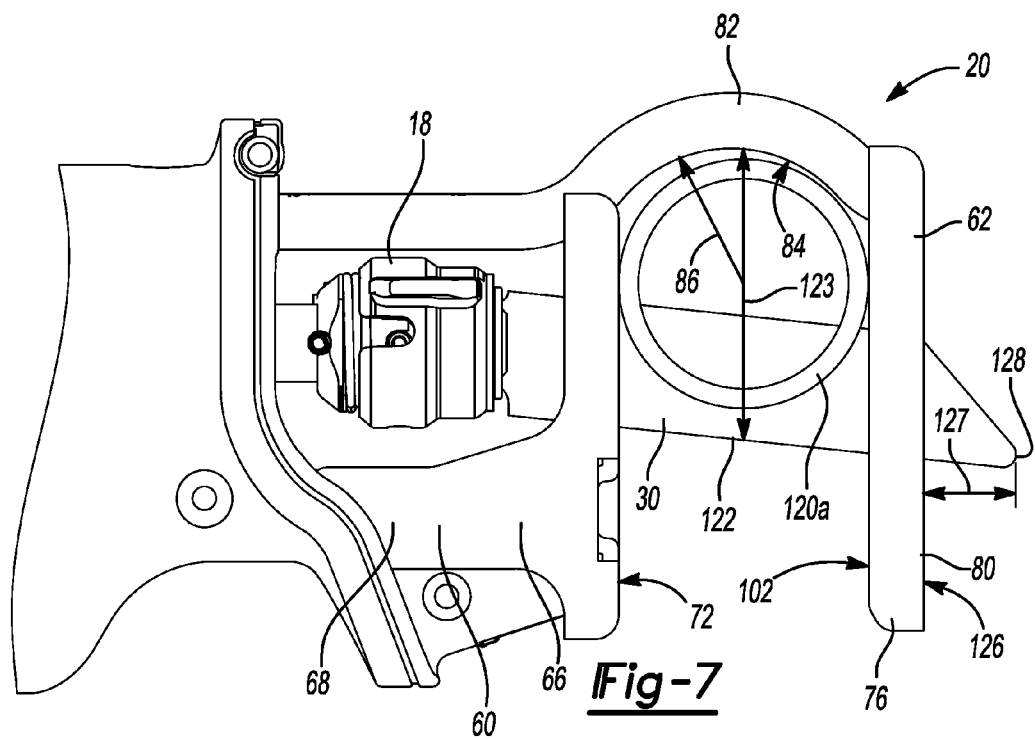
FIG. 7 is a side view of the reciprocating saw of FIG. 6 and shown subsequent to cutting through one of the pipes and further shown illustrating an arcuate section of the upper movable shoe accommodating the pipe.

The cutting action is continued until the cutting surface 122 of the saw blade 30 has passed entirely through the pipe being cut (FIG. 7). The profile of the pipe being cut, such as the pipe 120a illustrated in FIG. 7 is accommodated by the arcuate section 82 of the movable shoe 62. In some examples, the material facing surface 84 of the arcuate section 82 can engage the pipe (120a, etc.) that has been cut entirely through. While the specific example illustrated includes a pipe 120a having a diameter of one and a half inches, the clamp assembly 20 can be configured differently, such as having an arcuate section 82 that provides a greater radius 86 to accommodate pipes having larger diameters. Moreover, the connection portion 78 can be longer such that a larger clamping distance 106 can be attained. It will be appreciated that the arcuate section 82 can also provide the user with increased control over the reciprocating saw 10 as a whole by the contact of the material facing surface 84 on the arcuate section 82 with the pipe 120a. In this regard, such engagement between the material facing surface 84 of the arcuate section 82 can minimize a user's tendency to urge the reciprocating saw 10 further toward a cutting direction after cutting has been completed.

According to yet another method of use, a forward positioning surface 126 on the movable shoe 62 can be used as a reference on a work piece when the depth of cut attained by the saw blade 30 needs to be controlled. In this regard, a user can adjust the movable shoe 62 with the securing bolt 100 as described above to a desired location that corresponds to a cut depth 127 (FIG. 7) measured from a distal cutting tip 128 of the saw blade 30 at its furthest extension of the cutting stroke. As can be appreciated, a user can position the forward positioning surface 126 against a work piece, such as drywall for example, while cutting through the drywall with the cutting surface 122 of the saw blade 30. As can be appreciated, even though the user's vision may be blocked as to what may be behind the work piece (drywall, etc.), the user knows how deep the saw blade 30 will penetrate into the work piece. The forward positioning surface 126 on the movable shoe 62 can also be used to limit the amount of cutting surface 122 that engages a work piece. For example, in some instances, teeth near the blade retaining mechanism 18 may become dull as compared to teeth near the tip 128 of the saw blade 30. By moving the movable shoe 62 forward (toward the tip 128) the cutting stroke can be limited to exposure to teeth closer to the distal cutting tip 128. A notch 129 can also be incorporated on the movable shoe 62. The notch 129 can be used to pull nails or tacks.

Figure 8:
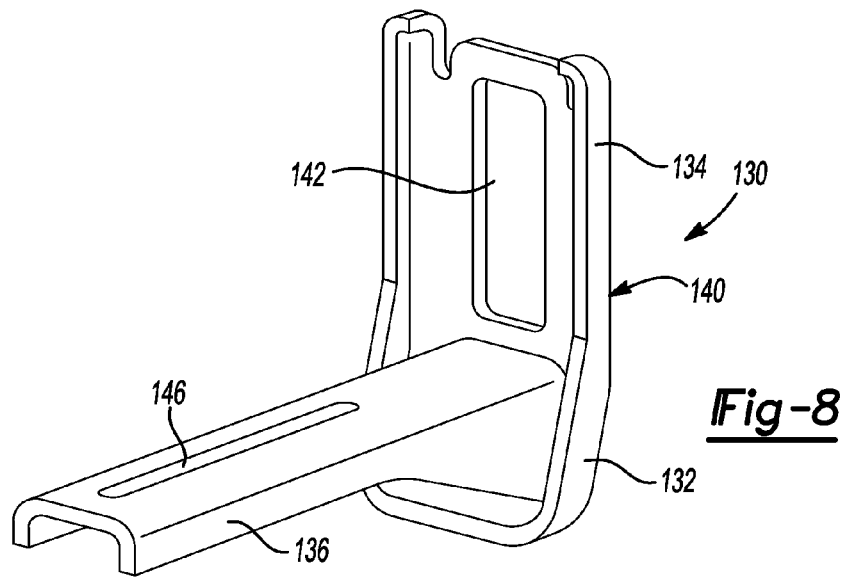
FIG. 8 is a perspective view of a lower movable shoe constructed in accordance to additional features of the present teachings.
Figure 9:
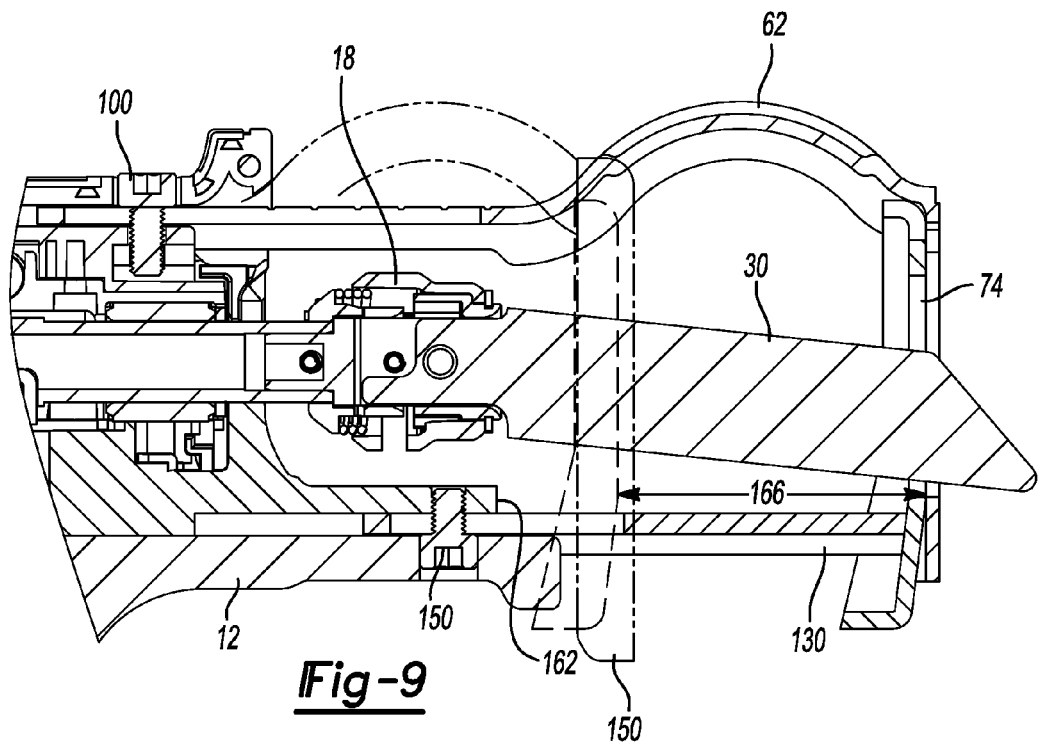
FIG. 9 is a side view of an exemplary reciprocating saw incorporating a clamp assembly having the lower adjustable shoe shown in FIG. 8.

With reference now to FIGS. 8 and 9, a lower adjustable shoe 130 constructed in accordance to additional features of the present teachings will be described. The lower adjustable shoe 130 can generally comprise an adjustable shoe body 132 having a clamping portion 134 and a connecting portion 136. The clamping portion 134 can have a material engaging surface 140 and define an opening 142 that receives the saw blade 30. The connecting portion 136 can define an elongated passage 146 that selectively receives an adjusting bolt 150 that is threadably received by the housing 12. The adjustable shoe body 132 can be formed as a unitary piece or alternatively can be formed by separate sections including the clamping portion 134 and connecting portion 136 that are coupled together, such as by a welding operation. The lower adjustable shoe 130 can slidably adjust relative to the housing 12 similar to the upper movable shoe 62 described above. Specifically, the fastener 150 can be loosened and the connecting portion 136 can slidably adjust through an opening 162 formed in the housing 12. Once the desired location has been attained, a user can tighten the fastener 150, such that a head of the fastener 150 fixedly secures the connecting portion 136 to the housing 12. It will be appreciated that a user may additionally or alternatively desire to adjust the upper movable shoe 62 to achieve a desired clamp distance 166.

Figure 10:
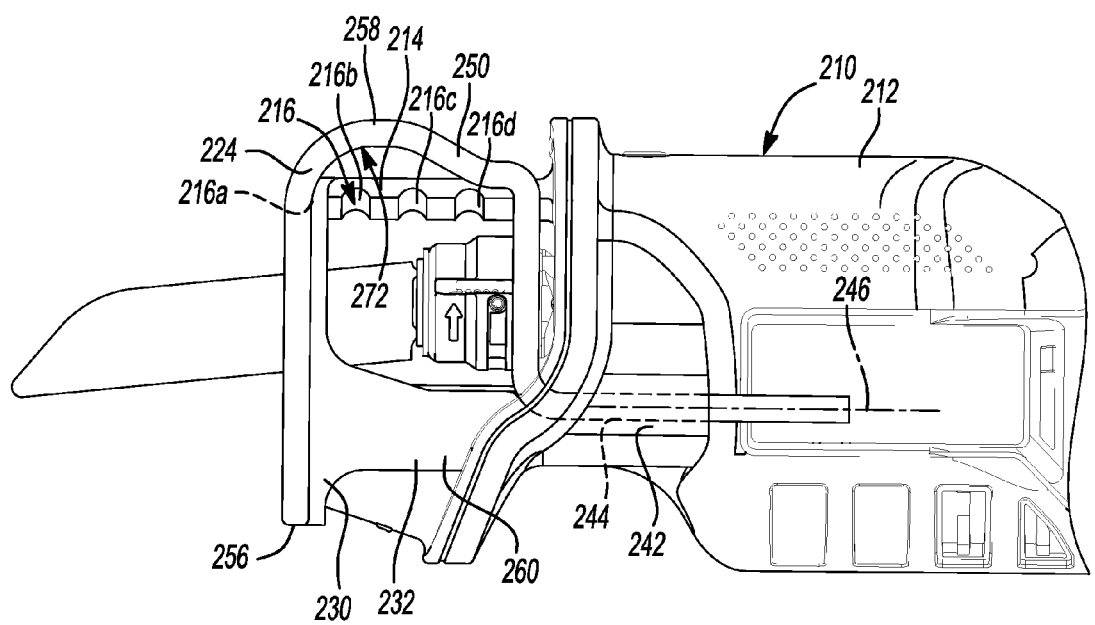
FIG. 10 is a side view of an exemplary reciprocating saw incorporating a clamp assembly constructed in accordance to additional features.
Figure 11:
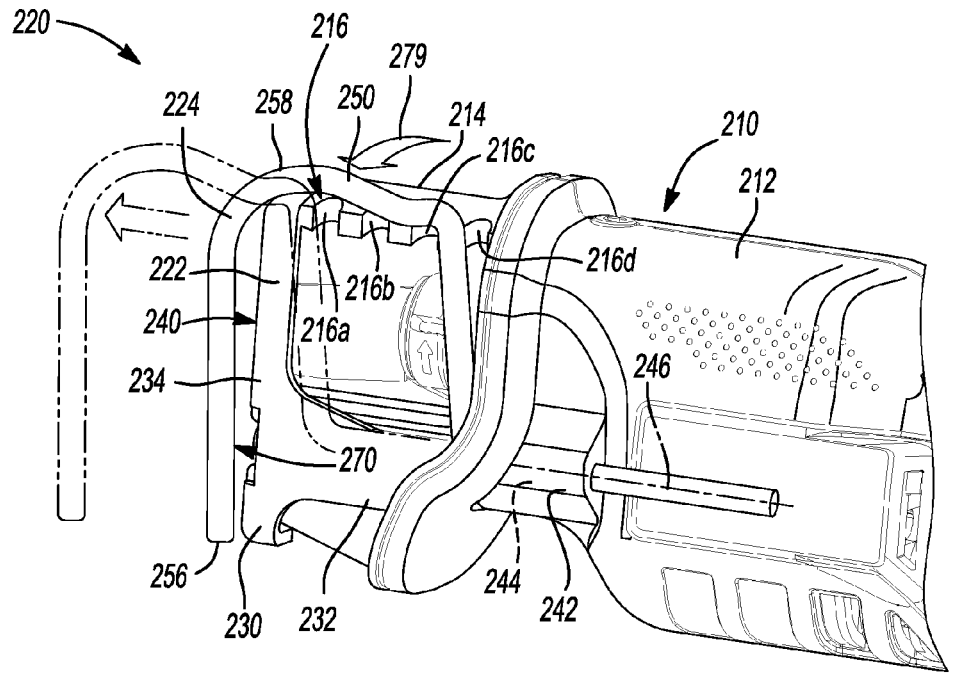
FIG. 11 is a side perspective view of the reciprocating saw of FIG. 10 and shown during adjustment of the upper movable shoe of the clamp assembly.
Figure 12:
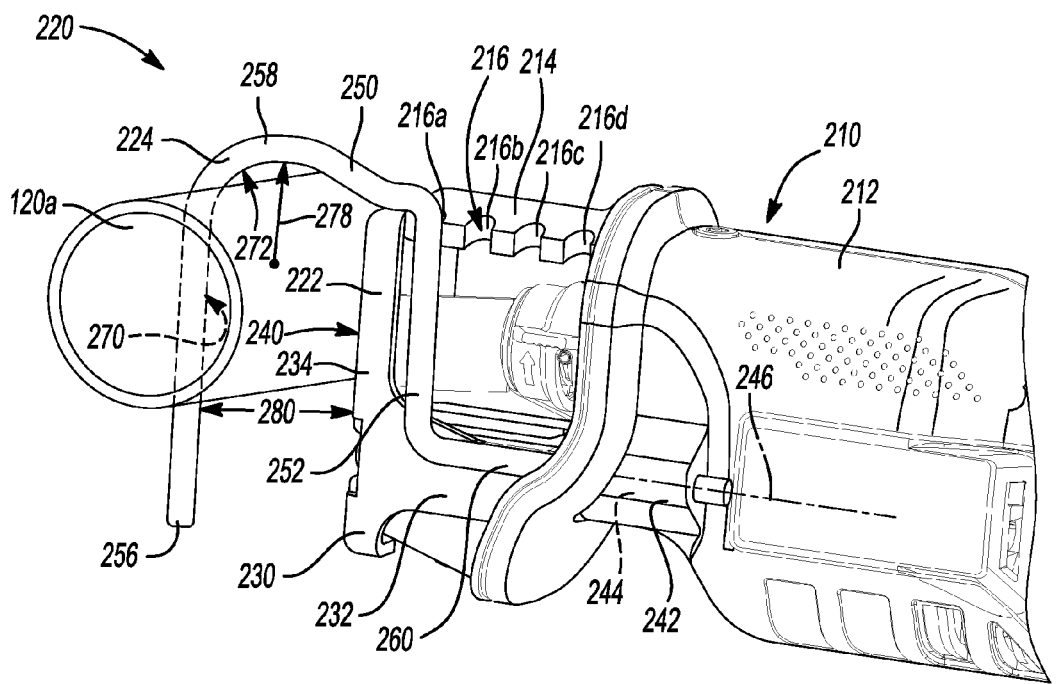
FIG. 12 is a side perspective view of the reciprocating saw of FIG. 11 and shown subsequent to adjusting and with a pipe being cut.

With reference now to FIGS. 10-12, a reciprocating saw 210 incorporating a clamp assembly 220 according to additional features of the present teachings will be described. Unless otherwise described herein, the reciprocating saw 210 and the clamp assembly 220 can be constructed similarly to the reciprocating saw 10 and the clamp assembly 20 described above. The clamp assembly 220 can generally comprise a first or lower fixed shoe 222 and a second or upper movable shoe 224. The lower fixed shoe 222 can be fixedly connected to a housing 212 of the reciprocating saw 210, such as by fasteners or can be formed at least in part by an extension of the housing 212. The lower fixed shoe can generally comprise a fixed shoe body 230 having a connection portion 232 and a clamping portion 234. The clamping portion 234 can comprise a material facing surface 240. A carrier 242 can be formed at least in part by the fixed shoe body 230 of the lower fixed shoe 222. The carrier 242 can additionally or alternatively be formed as part of the housing 212. The carrier 242 can define a bore 244 that defines an axis 246. The housing 212 can include a locating body 214 that has a plurality of grooves collectively referred to at reference numeral 216 and individually identified at reference numerals 216a, 216b, 216c and 216d.

The upper movable shoe 224 can generally comprise a movable shoe body 250. In the example shown, the body 250 can be formed by a cylindrical member 252. The cylindrical member 252 can be a steel spring to provide a snap fit with the grooves 216. The cylindrical member 252 can be formed of other materials such as entirely or partially with elastomeric material. The cylindrical member 252 can have a clamping portion 256, an arcuate section 258 and a connection portion 260. In some examples, the clamping portion 256 can be constructed like the clamping portion 80 (FIG. 4) described above. The connection portion 260 can be slidably received by the bore 244 of the carrier 242. In this regard, the connection portion 260 can be slidably extended and retracted from the bore 244 as will be described in greater detail.

The clamping portion 256 can include a material facing surface 270. The arcuate section 258 can include a material facing surface 272. The arcuate section 258 can be configured with a geometry, such that a radius 278 defined by the arcuate section 258 can accommodate a diameter of the pipe 120a subsequent to cutting as described above with respect to the clamp assembly 20. An exemplary sequence of adjusting the upper movable shoe 224 of the clamp assembly 220 will now be described. Initially, a user can rotate the body 250 of the upper movable shoe 224 around the axis 246 in the direction of arrow 279 away from engagement with the grooves 216.

The body 250 can then be extended or retracted from the bore 244 in a direction along the axis 246 and to a position where the clamping distance 280 defined between the material facing surfaces 240 and 270 is sufficient to accommodate a diameter of the pipe 120a. Next, a user can rotate the body 250 back toward engagement with one of the grooves 216 that will correspond to the desired clamping distance 280.

The user can then proceed with cutting of the pipe 120a. In one example, the user can move the cutting surface 122 of the saw blade 30 into contact with the pipe 120a being cut and concurrently or subsequently depress the trigger of the reciprocating saw 210. Again, while the saw blade 30 cuts through the pipe 120a, vibrations transmitted between the saw blade 30 and the pipe being cut 120a, the lower fixed shoe 222 and upper movable shoe 224 are minimized as the pipe 120a is inhibited from lateral movement (leftward or rightward as viewed from FIG. 12) by the material facing surface 240 of the lower fixed shoe 222 and the material facing surface 270 of the upper movable shoe 224.

The cutting action is continued until the cutting surface 122 of the saw blade 30 has passed entirely through the pipe 120a. The profile of the pipe being cut, such as the pipe 120a illustrated in FIG. 10 is accommodated by the arcuate section 258 of the upper movable shoe 224. It will be appreciated that the arcuate section 258 can also provide the user with increased control over the reciprocating saw 210 as a whole by the contact of the material engaging surface 272 on the arcuate section 258 with the pipe 120a. In this regard, such engagement between the material engaging surface 272 of the arcuate section 258 can minimize a user's tendency to urge the reciprocating saw 210 further toward a cutting direction after cutting has been completed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A reciprocating saw comprising:
    a housing;
    a motor disposed in the housing;
    a blade retaining mechanism that receives a saw blade;
    a drive mechanism that translates rotational motion of the motor into reciprocating motion of the blade retaining mechanism so that the saw blade reciprocates along an axis; and
    a clamp assembly comprising:
    a first shoe coupled to the housing and having a first shoe body including a first material facing surface substantially perpendicular to said axis;
    a second shoe coupled to the housing and having a second shoe body including a second material facing surface substantially perpendicular to said axis that opposes the first material facing surface defining a clamping distance therebetween;
    wherein at least one of the first and second shoes is selectively adjustable relative to the housing parallel to said axis such that the clamping distance alters to a maximum clamping distance;
    wherein one of the first or second shoe bodies has a third material facing surface that is offset away from the cutting surface of said saw blade in a direction perpendicular to said axis by a distance at least as great as said maximum clamping distance;
    wherein the second shoe body comprises the third material facing surface which has a central section that includes an arcuate section defining a radius and wherein the second shoe body selectively adjusts parallel to said axis relative to the housing; and
    wherein the maximum clamping distance is at least as large as two times the radius.

2. The reciprocating saw of claim 1 wherein the third material facing surface is oriented in an unopposing relationship to the cutting surface of the saw blade.

3. The reciprocating saw of claim 1 wherein the second shoe body is selectively adjustable to a location where the maximum clamping distance is at least 1.5 inches.

4. The reciprocating saw of claim 3 wherein the radius comprises about 0.75 inches such that the arcuate section accommodates an object being cut having a diameter of about 1.5 inches.

5. The reciprocating saw of claim 1 wherein both of the first and second shoe bodies define an opening for receiving the saw blade.

6. The reciprocating saw of claim 1 wherein the second shoe further comprises a connection portion that connects the second shoe body to the housing, the connection portion having a longitudinal body that extends substantially transverse to the second material facing surface.

7. The reciprocating saw of claim 1 wherein the first shoe body selectively adjusts relative to the housing resulting in changing of the clamping distance.

8. The reciprocating saw of claim 1 wherein the second shoe body includes a cylindrical member that selectively locates in one of a plurality of grooves formed on the housing and wherein the clamping distance alters based on the cylindrical member being located in a selected groove of the plurality of grooves.

9. A reciprocating saw comprising:
    a housing;
    a motor disposed in the housing;
    a blade retaining mechanism that receives a saw blade;
    a drive mechanism that translates rotational motion of the motor into reciprocating motion of the blade retaining mechanism; and
    a clamp assembly comprising:
    a first shoe coupled to the housing and having a first shoe body including a first material facing surface;
    a second shoe coupled to the housing and having a second shoe body including a second material facing surface that opposes the first material facing surface defining a clamping distance therebetween and a third material facing surface that comprises an arcuate section defining a radius; and
    wherein the second shoe is selectively adjustable relative to the housing to a location such that the clamping distance is at least twice the radius of the arcuate section.

10. The reciprocating saw of claim 9 wherein the third material facing surface is oriented in an unopposing relationship to a cutting surface of the saw blade.

11. The reciprocating saw of claim 9 wherein the second shoe body is selectively adjustable to a location where the clamping distance is at least 1.5 inches.

12. The reciprocating saw of claim 11 wherein the radius comprises substantially about 0.75 inches such that the arcuate section accommodates an object being cut having a diameter of substantially about 1.5 inches.

13. The reciprocating saw of claim 9 wherein both of the first and second shoe bodies define an opening for receiving the saw blade.

14. The reciprocating saw of claim 9 wherein the second shoe further comprises a connection portion that connects the second shoe body to the housing, the connection portion having a longitudinal body that extends substantially transverse to the second material facing surface, and wherein a locking member selectively locks the connection portion to the housing.

15. The reciprocating saw of claim 9 wherein the first shoe body selectively adjusts relative to the housing resulting in changing of the clamping distance.

16. The reciprocating saw of claim 9 wherein the second shoe body includes a cylindrical member that selectively locates in one of a plurality of grooves formed on the housing and wherein the clamping distance alters based on the cylindrical member being located in a selected groove of the plurality of grooves.

17. A reciprocating saw comprising:
a housing;
a motor disposed in the housing;
a blade retaining mechanism that receives a saw blade having a cutting surface;
a drive mechanism that translates rotational motion of the motor into reciprocating motion of the blade retaining mechanism; and
a clamp assembly comprising:
a first shoe coupled to the housing and having a first shoe body including a first material facing surface;
a second shoe coupled to the housing and having a second shoe body including a second material facing surface that opposes the first material facing surface defining a clamping distance therebetween and a third material facing surface that comprises an arcuate section defining a radius, the third material facing surface having an unopposed relationship with the cutting surface; and
wherein the second shoe is selectively adjustable relative to the housing and wherein the second shoe further comprises a connection portion that connects the second shoe body to the housing, the connection portion having a longitudinal body including a longitudinal opening that extends substantially transverse to the second material facing surface wherein a securing bolt locates through the longitudinal opening and is selectively locked to the housing to a fixed position that secures the second shoe relative to the housing.

18. The reciprocating saw of claim 17 wherein the second shoe body is selectively adjustable to a location where the clamping distance is at least as large as two times the radius.

19. The reciprocating saw of claim 17 wherein the second shoe body defines a notch configured to interface with one of a nail or tack.

20. A reciprocating saw comprising:
a housing;
a motor disposed in the housing;
a blade retaining mechanism that receives a saw blade having a cutting surface;
a drive mechanism that translates rotational motion of the motor into reciprocating motion of the blade retaining mechanism; and
a clamp assembly comprising:
a first shoe coupled to the housing and having a first shoe body including a first material facing surface;
a second shoe coupled to the housing and having a second shoe body including a second material facing surface that opposes the first material facing surface defining a clamping distance therebetween and a third material facing surface that comprises an arcuate section defining a radius that projects upwardly relative to the cutting surface, the third material facing surface having an unopposed relationship with the cutting surface; and
wherein the second shoe is selectively adjustable relative to the housing including to a location where said arcuate section is substantially centered between said first and second material facing surfaces; and
wherein the second shoe further comprises a connection portion that connects the second shoe body to the housing, the connection portion having a longitudinal body that extends substantially transverse to the second material facing surface, and further wherein a locking member selectively locks the connection portion to the housing at a fixed position that secures the second shoe relative to the housing.

21. The reciprocating saw of claim 20 wherein the second shoe body is selectively adjustable to a location where the clamping distance is at least as large as two times the radius.

22. A reciprocating saw comprising:
a housing;
a motor disposed in the housing;
a blade retaining mechanism that receives a saw blade having a cutting surface;
a drive mechanism that translates rotational motion of the motor into reciprocating motion of the blade retaining mechanism so that the saw blade reciprocates along an axis; and
a clamp assembly comprising:
a first shoe coupled to the housing and having a first shoe body including a first material facing surface;
a second shoe coupled to the housing and having a second shoe body including a second material facing surface that opposes the first material facing surface defining a clamping distance therebetween and a third material facing surface that comprises an arcuate section defining a radius that projects upwardly relative to the cutting surface; and
wherein the second shoe is selectively adjustable relative to the housing parallel to said axis to a location such that the arcuate section is substantially centered between said first and second material facing surfaces.

23. The reciprocating saw of claim 22 wherein the second shoe body is selectively adjustable to a location where the clamping distance is at least as large as two times the radius.

24. A reciprocating saw comprising:
a housing;
a motor disposed in the housing;
a blade retaining mechanism that receives a saw blade having a cutting surface;
a drive mechanism that translates rotational motion of the motor into reciprocating motion of the blade retaining mechanism; and
a clamp assembly comprising:
a first shoe coupled to the housing and having a first shoe body including a first material facing surface;
a second shoe coupled to the housing and having a second shoe body including a second material facing surface that opposes the first material facing surface defining a clamping distance therebetween and a third material facing surface, the third material facing surface having an unopposed relationship with the cutting surface;
wherein the second shoe is selectively adjustable relative to the housing and wherein the second shoe further comprises a connection portion that connects the second shoe body to the housing, the third material surface being between the connection portion and the second material facing surface; and wherein the third material surface includes at least a portion that is offset from the connection portion in a direction away from the cutting surface.

25. The reciprocating saw of claim 24, wherein the third material surface comprises at least one of a polygonal shape and an arcuate section.

26. The reciprocating saw of claim 24, wherein the third material surface comprises an arcuate surface.

27. The reciprocating saw of claim 24, wherein the drive mechanism has a first longitudinal axis and the connection portion has a second longitudinal axis that is parallel to the first longitudinal axis.

* * * * *